United States Patent
Fehske et al.

(10) Patent No.: US 10,285,089 B2
(45) Date of Patent: *May 7, 2019

(54) METHOD FOR JOINT AND COORDINATED LOAD BALANCING AND COVERAGE AND CAPACITY OPTIMIZATION IN CELLULAR COMMUNICATION NETWORKS

(71) Applicant: ACTIX GMBH, Dresden (DE)

(72) Inventors: Albrecht Fehske, Dresden (DE); Christian Isheden, Radebeul (DE); Henrik Klessig, Dresden (DE); Jens Voigt, Dresden (DE)

(73) Assignee: ACTIX GMBH, Dresden (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/688,672

(22) Filed: Aug. 28, 2017

(65) Prior Publication Data
US 2017/0359748 A1    Dec. 14, 2017

Related U.S. Application Data

(63) Continuation of application No. 14/423,701, filed as application No. PCT/EP2013/067636 on Aug. 26, 2013, now Pat. No. 9,775,068.

(30) Foreign Application Priority Data

Aug. 24, 2012  (EP) .................................... 12181705

(51) Int. Cl.
*H04W 28/02*    (2009.01)
*H04W 16/18*    (2009.01)
(Continued)

(52) U.S. Cl.
CPC ......... *H04W 28/021* (2013.01); *H04W 16/18* (2013.01); *H04W 24/02* (2013.01); *H04W 28/0226* (2013.01); *H04W 28/08* (2013.01)

(58) Field of Classification Search
CPC ... H04W 16/18; H04W 24/02; H04W 28/021; H04W 28/0226; H04W 28/08
See application file for complete search history.

(56) References Cited

U.S. PATENT DOCUMENTS 5,640,384 A * 6/1997 Du ........................ H04L 12/42
370/221
6,463,454 B1 * 10/2002 Lumelsky ............. G06F 9/5083
707/E17.12
(Continued)

FOREIGN PATENT DOCUMENTS

CN          1300988 A       6/2001
CN          1817056 B       12/2010
WO    WO-2011149085 A1 *   12/2011    ............ H04W 28/08

OTHER PUBLICATIONS

Chinese Office Action from Chinese Application No. 201380044208. 7, dated Jul. 28, 2017.
(Continued)

*Primary Examiner* — Dung B Huynh
(74) *Attorney, Agent, or Firm* — Zilka-Kotab, P.C.

(57) ABSTRACT

The present invention relates to a method for optimizing a real cellular, wireless communication network that combines mobility load balancing (MLB) with coverage and capacity optimization (CCO) in a joint and coordinated optimization. An optimal set of physical base station parameters is determined by performing an iterative direct search. The iterative direct search comprises a partitioning strategy to jointly determine an optimal partition of the served area and an associated optimal load of each of the plurality of base stations for a current set of physical base station parameters for each direct search iteration; said partitioning strategy using an updated value of the received power of the pilot or reference signal for each the plurality of user (Continued)

locations associated with the current set of physical base station parameters for each direct search iteration.

18 Claims, 7 Drawing Sheets

(51) Int. Cl.
    *H04W 24/02*     (2009.01)
    *H04W 28/08*     (2009.01)

(56) References Cited

U.S. PATENT DOCUMENTS

| | | | | |
|---|---|---|---|---|
| 6,711,404 | B1* | 3/2004 | Arpee | H04W 16/18 455/423 |
| 7,768,968 | B2* | 8/2010 | Plehn | H04W 16/18 370/329 |
| 2005/0048965 | A1* | 3/2005 | Ebata | H04W 24/00 455/424 |
| 2005/0090263 | A1* | 4/2005 | Ebata | H04W 16/08 455/453 |
| 2005/0176419 | A1* | 8/2005 | Triolo | H04W 52/343 455/423 |
| 2005/0254455 | A1* | 11/2005 | Plehn | H04W 16/18 370/328 |
| 2006/0094439 | A1* | 5/2006 | Christian | H04W 24/00 455/452.2 |
| 2006/0133332 | A1 | 6/2006 | Achanta | |
| 2007/0037579 | A1* | 2/2007 | Francalanci | H04W 16/18 455/446 |
| 2008/0032727 | A1* | 2/2008 | Stephenson | H04W 24/00 455/513 |
| 2008/0119216 | A1* | 5/2008 | Lee | H04W 52/24 455/522 |
| 2009/0088171 | A1* | 4/2009 | Aoyama | H04W 16/18 455/446 |
| 2009/0316585 | A1* | 12/2009 | Srinivasan | H04W 24/02 370/241 |
| 2010/0285743 | A1* | 11/2010 | Li | H04B 7/15557 455/15 |
| 2011/0287771 | A1* | 11/2011 | Oyama | H04W 24/02 455/446 |
| 2012/0207467 | A1* | 8/2012 | Lee | H04J 14/0257 398/16 |
| 2012/0236717 | A1* | 9/2012 | Saska | H04W 48/02 370/235 |
| 2013/0023217 | A1* | 1/2013 | Zhuang | H04W 24/02 455/63.1 |
| 2013/0040683 | A1* | 2/2013 | Siomina | H04W 28/0236 455/517 |
| 2013/0053039 | A1* | 2/2013 | Jorguseski | H04W 24/02 455/436 |
| 2013/0072202 | A1* | 3/2013 | Nakamura | H04W 16/08 455/445 |
| 2013/0072259 | A1* | 3/2013 | Kusano | H04W 28/08 455/561 |
| 2013/0090128 | A1* | 4/2013 | Sawamoto | H04W 24/02 455/452.2 |
| 2013/0109387 | A1* | 5/2013 | Tinnakornsrisuphap | H04W 16/08 455/436 |
| 2013/0142133 | A1* | 6/2013 | Pedersen | H04W 16/10 370/329 |
| 2013/0150044 | A1* | 6/2013 | Zhang | H04W 52/0258 455/436 |
| 2014/0019619 | A1* | 1/2014 | Senarath | H04W 16/12 709/226 |
| 2014/0113638 | A1* | 4/2014 | Zhang | H04W 16/18 455/446 |

OTHER PUBLICATIONS

European Office Action from European Application No. 13 756 088.4-1854, dated Apr. 18, 2017.

* cited by examiner

Fig. 1

Algorithm 1 Inner Loop

Input: $\alpha, \sigma(u) \forall u \in L, \forall i \in B : p_i(u) \forall u \in L, \varepsilon_1, \varepsilon_2, a, b, \beta$ 1: $l := 0$
2: for all $(i \in B)$ do
3: $\quad \eta_i^{(l)} := 1 - \varepsilon_1$
4: end for
5: repeat
6: $\quad$ for all $(i \in B, u \in L)$ do
7: $\quad\quad \gamma_i(u, \eta^{(l)}) = \dfrac{p_i(u, e_i)}{\sum_{j \in B \setminus \{i\}} \eta_j^{(l)} p_j(u, e_j) + \theta}$
8: $\quad\quad c_i(u, \eta^{(l)}) = a \cdot B \cdot \log_2(1 + b \cdot \gamma_i(u, \eta^{(l)}))$
9: $\quad$ end for
10: $\quad$ for all $(i \in B)$ do
11: $\quad\quad L_i(l) := \{u \in L \mid i + \text{argmax}_{j \in B} c_j(u, \eta^{(l)}) \cdot (1 - \eta_j^{(l)})\alpha\}$
12: $\quad$ end for
13: $\quad$ for all $(i \in \beta)$ do
14: $\quad\quad \eta_i^{(l+1)} := \beta \cdot \eta_i^{(l)} + (1 - \beta) \cdot \min\{\int_{L_i(l)} \dfrac{\sigma(u)}{c_i(u, \eta(l))} du, 1 - \varepsilon_1\}$
15: $\quad$ end for
16: $\quad l := l + 1$
17: until $(\|\eta^{(l)} - \eta^{(l-1)}\| < \varepsilon_2)$
18: $P_{opt} := \{L_1^{(l)}, ..., L_i^{(l)}, ..., L_N^{(l)}\}$
19: $\eta_{opt} := \eta^{(l)}$
20: return $(\eta_{opt}, P_{opt})$

Fig. 2

Algorithm 2 Outer Loop

Input: $e(\text{start})$, $C_{rx,min}$, $C_{\gamma,min}$, $\eta_{sup}$, $\eta_{inf}$, $e_\Delta \in N^+$, $L \in N^+$, $\alpha$, all inputs required for inner loop 1: $l := 0$
2: $e := e(\text{start})$
3: compute $\eta(\alpha)$ using inner loop
4: while $(l < L)$ do
5:     $B_S := \text{sort}(B)$ acc. $\eta_i$ in descending order
6:     for all $(i \in B_S)$ do
7:        $\varepsilon_i := \{e_i - e^\circ_\Delta, ..., e_i - 1^\circ, ..., e_i, e_i + 1^\circ, ..., e_i + e^\circ_\Delta\}$
8:        for all $(e \in E1)$ do
9:           compute $\eta(\alpha, e)^{(l)}$ and $P^{(l)}$ using inner loop, using updated $p_i(u, e)$ $\forall u \in L$
10:          compute $C_{rx}(e)$ and $C_\gamma(\eta, e)$, using updated $pi(u,e)$ $\forall u \in L$
11:        end for
12:        $\varepsilon' := \{e \in \varepsilon_i \mid C_{rx} \geq C_{rx,min} \wedge C_\gamma \geq C_{rx,min} \wedge \forall \eta_i \leq \eta_{sup} \wedge \forall \eta_i \geq \eta_{inf}\}$
13:        if $(\varepsilon' = \emptyset)$ then select $\varepsilon' \subset \varepsilon_i$ using a policy end if
14:        select $e_i^{(l)} \in \varepsilon'$ using a policy
15:     end for
16:     $l := l + 1$
17: end while
18: $P_{selected} := P(l)$
19: $\eta_{selected} := \eta(l)$
20: $e_{selected} := \{e_i(l) \, \forall i \in B\}$
21: if $\exists \eta_i \in \eta_{selected} > \eta_{sup} \rightarrow$ signal
22: if $\exists \eta_i \in \eta_{selected} < \eta_{inf} \rightarrow$ signal
23: return $(e_{selected}, P_{selected})$

Fig. 3

Algorithm 3 Embodiment Two

Input: $e^{(start)}$, $C_{rx,min}$, $C_{\gamma,min}$, $\eta_{sup}$, $e_\Delta \in \mathbb{IN}^+$, $L \in \mathbb{IN}^+$, $\alpha$, all inputs required for inner loop 1: $l := 0$
2: $e := e^{(start)}$
3: compute $\eta(\alpha)$ using inner loop
4: while ($l < L$) do
5:     $B_S := \text{sort}(B)$ acc. $\eta_i$ in descending order
6:     for all ($i \in B_S$) do
7:         $\varepsilon_i := \{e_i - e^\circ \Delta, ..., e_i - 1^\circ, e_i, e_i + 1^\circ, ..., e_i + e^\circ \Delta\}$
8:         for all ($e \in \varepsilon_i$) do
9:             compute $\eta(\alpha, e)^{(l)}$ and $P^{(l)}$ using inner loop, using updated $pi$ $(u, e)$ $\forall u \in L$
10:            compute $C_{rx}(e)$ and $C_\gamma (\eta, e)$, using updated $pi(u,e)$ $\forall u \in L$
11:         end for
12:         $\varepsilon' := \{e \in \varepsilon_i \mid C_{rx} \geq C_{rx,min}\}$
13:         $\varepsilon'' := \{e \in \varepsilon_i \mid C_{rx} \geq C_{rx,min} \wedge C_\gamma \geq C_{\gamma,min}\}$
14:         $\varepsilon''' := \{e \in \varepsilon_i \mid C_{rx} \geq C_{rx,min} \wedge C_\gamma \geq C_{\gamma,min} \wedge \forall \eta_i \leq \eta_{sup}\}$
15:         if ($\varepsilon' = \emptyset$)     then select $e_i^{(l)} := \underset{e \in \varepsilon_i}{\arg\max}\ C_{rx}$
16:         else if ($\varepsilon'' = \emptyset$)     then $e_i^{(l)} := \underset{e \in \varepsilon'}{\arg\max}\ C_\gamma$
17:         else if ($\varepsilon''' = \emptyset$)     then $e_i^{(l)} := \underset{e \in \varepsilon''}{\arg\min} \sum_{\eta_i > \eta_{sup}} |L_i|$
18:         else          $e_i^{(l)} := \underset{e \in \varepsilon''}{\arg\min} \sum_{i \in B} \eta_i$
19:         end if
20:     end for
21:     $l := l + 1$
22: end while
23: $P_{opt} := P^{(l)}$
24: $e_{selected} := \{e_i(l) \mid \forall i \in B\}$
25: return ($e_{selected}$, $P_{opt}$)

Fig. 4

Algorithm 4 Embodiment Three
Input: $C_{\gamma,min}$, $\eta_{sup}$, $\Delta\alpha$, all inputs required for inner loop
1: $\alpha_{min} = 0$, $\alpha_{max} = 0$
2: $l = 0$
3: $\alpha^{(l)} = 0$
4: repeat
5:    compute $\eta(\alpha^{(l)})$ using inner loop
6:    compute $C_\gamma(\eta(\alpha^{(l)}))$
7:    if $C_\gamma^{(l)} \geq C_{\gamma,min}$ then $\alpha_{max} := \alpha^{(l)}$
8:    if $\eta^{(l)} \leq \eta_{sup}$ then $\alpha_{min} := \alpha^{(l)}$
9:    $\alpha^{(l+1)} = \alpha^{(l)} + \Delta\alpha$
10:    $l := l + 1$
11: until $C_\gamma^{(l-1)} < C_{\gamma,min}$ and $\eta^{(l-1)} > \eta_{sup}$
12: $\alpha_{selected} = f_\alpha(\alpha_{max}, \alpha_{min})$
13: compute $\mathcal{P}_{opt}(\alpha_{selected})$ using inner loop
14: return $\mathcal{P}_{opt}(\alpha_{selected})$

Fig. 5

Algorithm 5 Embodiment 4

Input: $e^{(start)}$, $C_{rx,min}$, $C_{\gamma,min}$, $\eta_{sup}$, $\eta_{inf}$, $e_\Delta \in \mathbb{N}^+$, $L \in \mathbb{N}^+$, all inputs required for inner loop 1: $l := 0$
2: $e := e^{(start)}$
3: compute $\eta(\alpha = 0)$ using inner loop
4: while $(l < L)$ do
5:     $\mathcal{B}_s := \text{sort}(\mathcal{B})$ acc. $\eta_i$ in descending order
6:     for all $(i \in \mathcal{B}_s)$ do
7:        $\mathcal{E}_i := \{e_i - e_\Delta^i, \ldots, e_i - 1^i, e_i, e_i + 1^i, \ldots, e_i + e_\Delta^i\}$
8:        for all $(e \in \mathcal{E}_i)$ do
9:           compute $\alpha$ using Embodiment 3
10:         compute $\eta(\alpha, e)^{(l)}$ and $\mathcal{P}^{(l)}$ using inner loop, using updated $p_k(u,e)\forall u \in \mathcal{L}$
11:         compute $C_{rx}(e)$ and $C_\gamma(\eta, e)$, using updated $p_k(u,e)\forall u \in \mathcal{L}$
12:        end for
13:        $\mathcal{E}' := \{e \in \mathcal{E}_i \mid C_{rx} \geq C_{rx,min} \wedge C_\gamma \geq C_{\gamma,min} \wedge \forall \eta_i \leq \eta_{sup} \wedge \forall \eta_i \geq \eta_{inf}\}$
14:        if $(\mathcal{E}' = \emptyset)$ then select $\mathcal{E}' \subset \mathcal{E}_i$ using a policy end if
15:        select $e_i^{(l)} \in \mathcal{E}'$ using a policy
16:     end for
17:     $l := l + 1$
18: end while
19: $\mathcal{P}_{selected} := \mathcal{P}^{(l)}$
20: $\eta_{selected} := \eta^{(l)}$
21: $e_{selected} := \{e_i^{(l)} | \forall i \in \mathcal{B}\}$
22: if $\exists \eta_i \in \eta_{selected} > \eta_{sup} \longrightarrow$ signal
23: if $\exists \eta_i \in \eta_{selected} < \eta_{inf} \longrightarrow$ signal
24: return $(e_{selected}, \mathcal{P}_{selected})$

METHOD FOR JOINT AND COORDINATED LOAD BALANCING AND COVERAGE AND CAPACITY OPTIMIZATION IN CELLULAR COMMUNICATION NETWORKS

CLAIM OF PRIORITY

This application is a continuation of U.S. Pat. No. 9,775, 068, filed Feb. 24, 2015, which claims priority to a PCT Application No. PCT/EP2013/067636, filed on Aug. 26, 2013, which claims priority to a European Patent Application No. 12181705.0, filed on Aug. 24, 2012, all of which are incorporated herein by reference.

FIELD OF THE INVENTION

Wireless communications networks, more specifically network planning, e.g. coverage or traffic planning tools; network deployment, e.g. resource partitioning or cell structures, esp. traffic adaptive resource partitioning, supervisory, monitoring or testing arrangements, esp. arrangements for optimizing operational condition, network traffic or resource management, esp. load balancing or load distribution, and handoff or reselecting arrangements, esp. performing reselection for specific purposes for optimizing the interference level.

BACKGROUND OF THE INVENTION AND DESCRIPTION OF THE PRIOR ART

The term self-organizing networks (SON) identifies the next generation technology for planning, optimization, and healing of wireless cellular networks. Although this technology is under discussion mainly for 3GPP LTE, the ideas behind SON will also be adapted for legacy cellular network technologies.

SOCRATES (e.g., in SOCRATES web page. Online: http://www.fp7-socrates.org, Feb. 26, 2012) was a project funded by the European Union between 2008 and 2010 with the aim of developing SON methods and algorithms for LTE mobile networks. The concepts given by the SOCRATES project provide a holistic framework to design SON algorithms and to reveal control parameter interdependencies and interactions among different algorithms. Multiple processes can be aggregated to so-called use cases, which may be independent or may interact since they can operate on common control parameters. Examples of SON use cases for network optimization are mobility load balancing (MLB), coverage and capacity optimization (CCO), and mobility robustness optimization (MRO). Each of these is expected to run independently in a certain deployment area of the cellular network and to address issues related to imbalanced load between cells, coverage holes or low signal-to-interference-and-noise ratios (SINRs), or handover failures by changing parameters defined in the configuration management (CM) of the cellular network. These autonomously running SON use case implementations naturally run into problems of conflicting parameter changes. For that reason, a SON coordinator is necessary for resolving possible parameter conflicts. The coordination is considered as the most critical challenge to meet and, therefore, coordination mechanisms have to be developed carefully. In SOCRATES, so-called heading or tailing coordination of conflicting parameters (before or after the independently determined parameters changes) is favored.

Drawbacks of this state of the art include:
need for complex policies to coordinate the parameterization of conflicting single use case implementations heading or tailing, hence need for additional coordination of parameters of otherwise independently running SON optimization use case implementations A theoretical approach to the unified treatment of user association and handover optimization based on cell loads is presented in H. Kim et al., "Distributed α-Optimal User Association and Cell Load Balancing in Wireless Networks", IEEE/ACM Transactions on Networking 20:1, pp. 177-190 (2012). Drawbacks of this work include:
not possible to predict the effect of a sudden change in the network configuration
is not compatible with the 3GPP standards
  Provides partitioning of cells, but no base station individual power offset for the received power of the base station's pilot or reference signal to be used to increase the base stations serving area for the purpose of user association for admission control, cell reselection in silent mode, and handover in active mode
  Assumes that the UEs can take a decision on cell selection based on knowledge of the loads of surrounding base stations; however, in 3GPP the UEs only measure power levels and report them to the BS, where all decisions are taken
is not able to estimate and predict base station loads and load changes in the future since BSs measure their average utilizations, but do not calculate the average loads
does not explicitly include the BS load in the SINR estimations, BS are not aware of the load of neighboring cells
a user location is not guaranteed to be served
does not include a load constraint for a cell/base station Another theoretical framework in the field of the invention is presented in Iana Siomina and Di Yuan, "Analysis of Cell Load Coupling for LTE Network Planning and Optimization", IEEE Transactions on Wireless Communications, 11:6, June 2012. In this work, the inter-cell interference is explicitly taken into account in a cell-load coupling function, overcoming some of the drawbacks of said work of H. Kim et al. Drawbacks of this work include:
The cell load is not bounded to the maximum value of full load, the framework allows cells with a load of more than 100%
Does not provide an optimal cell partition, or any recommendation for setting the cell individual power offsets.
The optimization objective is limited to the minimization of the sum load of all cells.

This framework was applied in Iana Siomina and Di Yuan: "Load Balancing in Heterogeneous LTE: Range Optimization via Cell Offset and Load-Coupling Characterization", IEEE International Conference on Communications, pp. 1377-1381, Ottawa, Canada, Jun. 10-15, 2012 for load balancing in a heterogeneous network via a cell individual power offset given to the low power node (small cells). Drawbacks of this work include:
The load is balanced using Jain's fairness index as metric.
Only load balancing is considered (MLB only). There is no coordination or any other combination with physical base parameter optimization.
The solution is approached via a sequence of upper and lower bounds.

A method and device for the optimization of base station antenna parameters in cellular wireless communication networks was described in EP1559289/U.S. Pat. No. 7,768,968. Drawbacks of this state of the art include:

- only physical base station parameters are optimized, no load balancing parameter is used (CCO only)
- the serving area of a base station is always determined by user locations having the highest received power of this base stations pilot or reference signal, there is no power offset for this received power used to increase the base station's serving area for the purpose of user association.
- The target of load balancing is only seen as balancing the traffic demand distribution between the cells/base stations, not balancing the actual load of the base stations
- The degree of load balancing cannot be chosen and is not automatically optimized in this method
- the traffic demand per cell/base station is only taken into account by accumulating it over the base stations serving area defined above, the spatial distribution of the traffic demand is not taken into account in this method and device
- Does not automatically suggest new sites in case existing sites are overloaded regardless of CCO A further general drawback of the state of the art for CCO and/or MLB is that it cannot be used to do cell outage compensation (COC).

SUMMARY OF THE INVENTION

It therefore an objective of the present invention to provide a method that combines mobility load balancing (MLB) with coverage and capacity optimization (CCO) in a joint and coordinated optimization.

This objective is achieved with the features of the independent claim. The dependent claims relate to further aspects of the invention.

The present invention relates to a method for optimizing a real cellular, wireless communication network comprising a plurality of base stations and having a network configuration comprising a plurality of radio cells. The plurality of radio cells serves a served area. Each of the plurality of radio cells covering a cell area which is further sub-divided into user locations. The network is defined by network parameters. The method comprises

- providing a model of said cellular, wireless communication network having an original model network configuration;
- providing, for each of said user locations, a value of a received power of a pilot or reference signal and a traffic demand;
- optimizing said model network configuration by performing an iterative direct search to determine an optimal set of physical base station parameters.

The iterative direct search comprises:

a partitioning strategy to jointly determine an optimal partition of the served area and an associated optimal load of each of the plurality of base stations for a current set of physical base station parameters for each direct search iteration; said partitioning strategy using an updated value of the received power of the pilot or reference signal for each the plurality of user locations associated with the current set of physical base station parameters for each direct search iteration.

The method further comprises using said optimized model network configuration to configure said real cellular, wireless communication network.

The partitioning strategy may comprise computing a signal-to-interference-and-noise ratio coverage using the optimal partition of the served area and associated optimal load for each of the plurality of base stations and the updated value of the received power of the pilot or reference signal for each of the plurality of user locations for each direct search iteration.

The partitioning strategy may further comprise computing a reference signal received power coverage using the optimal partition of the served area and associated optimal load for each of the plurality of base stations and the updated value of the received power of the pilot or reference signal for each of the plurality of user locations for each direct search iteration.

Hence, the method according to the present invention combines two SON use cases, mobility load balancing (MLB) and coverage and capacity optimization (CCO), into one algorithm with a joint optimization objective to minimize a function of the loads of all base stations (BSs), which includes the minimization as a special case. The coordination of the use cases is inherent in the optimization method, which avoids the need for complex additional (e.g., heading or tailing) coordination of single use cases with conflicting objectives. The result of the joint optimization is a tuple of optimized settings of physical base station parameters and cell individual power offsets that increase the base station's serving area for the purpose of user association for admission control, cell reselection in idle mode, and handover in active mode.

The load of a BS is defined as the sum over all user locations in the BS serving area of the ratio of the traffic demand to an estimated data rate. When estimating the load of a BS, the spatial distribution of the traffic demand is thus explicitly taken into account. The serving area of a base station consists of the user locations, where the sum of the received power of this base station's pilot or reference signal and a corresponding power offset is the highest.

According to H. Kim et al., "Distributed $\alpha$-Optimal User Association and Cell Load Balancing in Wireless Networks", IEEE/ACM Transactions on Networking 20:1, pp. 177-190 (2012), a degree of load balancing parameter $\alpha$ can be defined, which has the following effect: It supports a family of load-balancing objectives as $\alpha$ ranges from 0 to $\infty$: rate-optimal ($\alpha=0$), throughput-optimal ($\alpha\geq1$), delay-optimal ($\alpha=2$), and minimizing the maximum BS load ($\alpha\to\infty$). This degree of load balancing is noted in the inventive method as either an input parameter into the method, or by optimizing the degree of load balancing parameter in the inventive method itself.

The inventive method is able to predict the effect of load changes in the network by estimating the load of a base station from (user location dependent) traffic demand and SINR. Hereby, every user location in the serving area of the base station cluster is guaranteed to be served in terms of coverage and SINR.

The inventive method further guarantees a supremum and an infimum for the load of each base station and optionally signals the need for an additional base station or the opportunity to shut down base stations (or put them in the Energy Saving state). Thus, the inventive method automatically signals the need for an additional base station in case the supremum of base station load cannot be met for all base stations, even after optimization of the physical base station parameters and power offsets. By doing so, the inventive method actively prevents over- and under-load of BSs.

Furthermore, the joint CCO and MLB optimization can be used without any changes for the SON use case cell outage compensation (COC), as it jointly targets coverage, SINR, and load balancing in a cluster of base stations and can compensate for a sudden, random, and unwanted outage of a base station in the optimized cluster.

Moreover, the method can be used for the SON use case energy saving management (ESM) as it outputs candidates for a desired state change into the Energy Saving state of base stations (as defined in 3GPP TS 32.551 V11.2.0 (2012-03), 3rd Generation Partnership Project; Technical Specification Group Services and System Aspects; Telecommunication management; Energy Saving Management (ESM); Concepts and requirements (Release 11)) by checking an infimum of the load of all base stations and reconfiguring other base stations in the Compensating for Energy Saving state by guaranteeing coverage, SINR, and load balancing targets for the service area of the cluster.

BRIEF DESCRIPTION OF THE DRAWINGS

The method according to the invention is described in more detail herein below by way of exemplary embodiments and with reference to the attached drawings, in which:

FIG. 4 shows an algorithm for an iterative direct search for a fixed load balancing parameter while optimizing over physical base station parameters;

FIG. 6 shows an algorithm for an iterative direct search by optimizing over physical base station parameters as well as a load balancing parameter.

DETAILED EXPLANATION OF THE INVENTIVE METHOD

Figure 1:
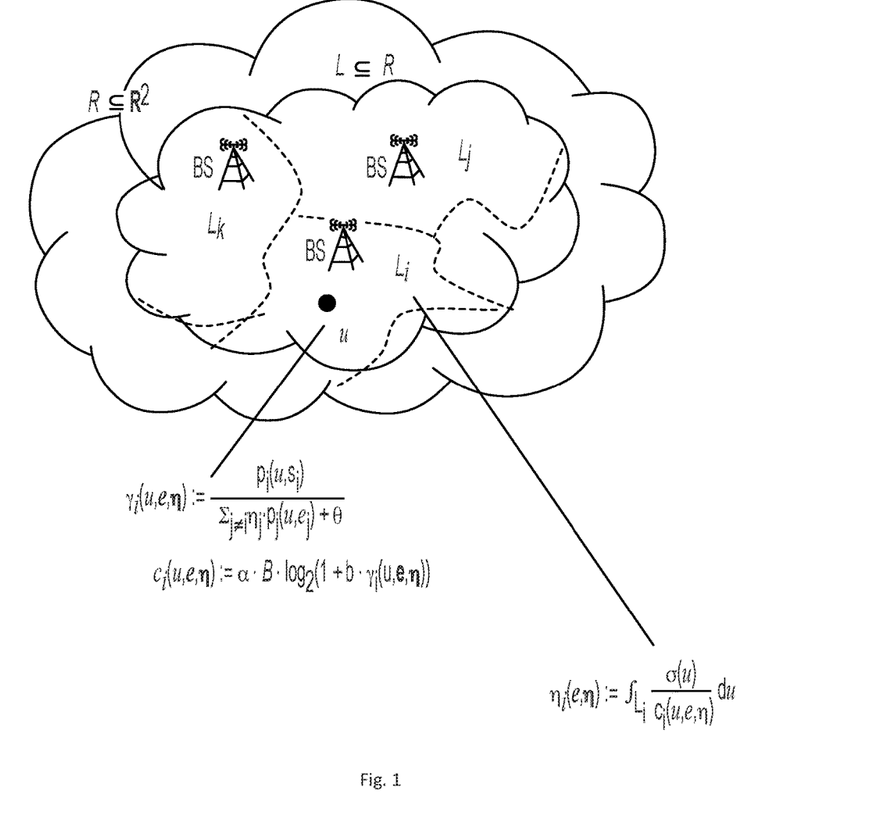
FIG. 1 shows a cluster of base stations of a cellular mobile communication network.

The method according to the present invention can be applied to a cluster of BSs in a cellular mobile radio access network as shown in FIG. 1. This cluster of BSs consists of N BSs, with indices i=1, . . . , N, deployed in a scenario region $\mathcal{R} \subseteq \mathbb{R}^2$. The region $\mathcal{R}$ is a set of locations u and may be represented by a rectangular matrix of discrete elements u with a size of, e.g., 50 m×50 m, see, e.g., EP1559289/U.S. Pat. No. 7,768,968.

The served area $\mathcal{L}$ is the set of locations u∈$\mathcal{R}$ at which a user is able to connect to at least one BS, i.e. where the received power of the BS pilot or reference signal from at least one BS exceeds a given threshold of the received power of the BS's pilot or reference signal: $p_{mm}$: $\mathcal{L}=\{u \in \mathcal{R} \mid p_i(u) \geq p_{min}\}$.

In contrast to the region definition in H. Kim et al., "Distributed α-Optimal User Association and Cell Load Balancing in Wireless Networks", IEEE/ACM Transactions on Networking 20:1, pp. 177-190 (2012), all locations u∈$\mathcal{L}$ are guaranteed to be served in the sense of receiving a minimum BS pilot or reference signal power.

The cell area $\mathcal{L}_i$ is defined as the subset of $\mathcal{L}$ served by BS i. Hence, $\mathcal{L}$ is partitioned into individual cell areas $\mathcal{L}_1, \ldots, \mathcal{L}_N$. A spatial partition on $\mathcal{L}$ is then denoted by $\mathcal{P}:=\{\mathcal{L}_1, \ldots, \mathcal{L}_N\}$.

Further, a signal-to-interference-and-noise ratio (SINR) of a BS pilot- or reference signal can be defined. The region within $\mathcal{L}_i$ where the BS's SINR exceeds a minimum value $\gamma_{min}$ is denoted by $\mathcal{L}_{i,\gamma}$: $\mathcal{L}_{i,\gamma}=\{u \in \mathcal{L}_i \mid \gamma_i(u) \geq \gamma_{min}\}$, if a user at location u chooses BS i as its serving BS.

The traffic demand $$\left(\text{e.g., in}\left[\frac{\text{Mbps}}{\text{km}^2}\right]\right)$$

per user location u is denoted by σ(u) with the possible normalization $\int_\mathcal{R} \sigma(u)du=1$. This traffic demand per user location can be weighted by a linear factor per user location which is an input to the method to simulate traffic demand changes and the consequences for the results of the inventive method.

The coverage $\mathcal{C}_{rx}$ is either defined as
the ratio of the served area to the area of the scenario region $$C_{rx} = \frac{|\mathcal{L}|}{|\mathcal{R}|}$$

or as the ratio of the served traffic demand to the traffic demand of the scenario region $$C_{rx} = \frac{\int_\mathcal{L} \sigma(u)du}{\int_\mathcal{R} \sigma(u)du}$$

The SINR coverage $\mathcal{C}_\gamma$ is either defined as
the ratio of the served area (having SINR coverage) to the area of the scenario region $$C_\gamma = \frac{\sum_{i \in \mathcal{B}} |\mathcal{L}_{i,\gamma}|}{|\mathcal{R}|}$$

or as the ratio of the served traffic demand which also has SINR coverage to the traffic demand of the scenario region $$C_\gamma = \frac{\sum_{i \in \mathcal{B}} \int_{\mathcal{L}_{i,\gamma}} \sigma(u)du}{\int_\mathcal{R} \sigma(u)du}$$

The load $\eta_i \geq 0$ of BS i is defined as the surface integral of the ratio of the traffic demand to an estimated data rate over the BS serving area:

$$\eta_i := \int_{\mathcal{L}_i} \frac{\sigma(u)}{c_i(u)} du$$

where $c_i(u)$ denotes an estimate of the data rate $c_i(u)$ at user location u, e.g., the Shannon data rate with parameters a and b used to tailor the bit rate $c_i(u)$ to a specific system configuration and transmission bandwidth B $$c_i(u) := a \cdot B \cdot \log_2(1 + b \cdot \gamma_i(u))$$

and further an estimate of the SINR $\gamma_i(u)$ of BS i at user location u with thermal noise $\theta$ in the transmission bandwidth:

$$\gamma_i(u) := \frac{p_i(u, e_i)}{\sum_{j \neq i} \eta_j \cdot p_j(u, e_j) + \theta}$$

Note that the estimation of the data rate $c_i(u)$ at user location u at least includes the SINR $\gamma_i(u)$ of BS i at user location u. The load $\eta_i$ of BS i depends on
- the number of user locations u in the area served by the base station,
- the traffic demand $\sigma(u)$ at user location u, and
- the SINR $\gamma_i(u)$, which in turn depends on
  - the physical parameters of BS i, summarized as e, and
  - the load of all other base stations $\eta_j$.

Physical base station parameters are defined as BS parameters which directly change the BS pilot- or reference signal receive power and include the base station's antenna parameters (e.g., antenna type, antenna number, antenna tilt, antenna azimuth, compare, e.g., compare EP1559289/U.S. Pat. No. 7,768,968) and the pilot- or reference signal transmission power. In terms of SON, easily changeable parameters such as the remote electrical tilt or the pilot- or reference signal transmission power are mostly used. To simplify the following descriptions, we use the electrical tilt only as example for base station physical parameters in the remainder. A person skilled in the art will appreciate that the following description is applicable to other physical BS parameters as well.

Thus, the SINR $\gamma_i$, the rate $c_i$, and the load $\eta_i$ are also a functions of the physical parameter vector e and the load vector $\eta$, hence they are denoted by $\gamma_i(u,e,\eta)$, $c_i(u,e,\eta)$, and $\eta_i(e,\eta)$, see FIG. 1 for a detailed illustration.

Then, the served cell area $\mathcal{L}_i$ of cell i is defined using the partitioning rule:

$$\mathcal{L}_i(e, \eta) := \left\{ u \in \mathcal{L} \mid i = \underset{j=1,\ldots,N}{\mathrm{argmax}}\, c_j(u, e, \eta)(1 - \eta_j)^\alpha \right\}$$

The objective of the inventive method is to partition the served area $\mathcal{L}$ into served cell areas $\mathcal{L}_i$ so, that
- a function of the loads of all base stations (BSs) is minimized:

$$f(e, \alpha) = \frac{1}{\alpha - 1} \sum_{i \in \mathcal{B}} (1 - \eta_i(\alpha, e))^{1-\alpha},$$

where the parameter $\alpha$ indicates how the cell loads are treated in the optimization, and
- the coverage constraint is fulfilled: $\mathcal{C}_{rx}(e) \geq \mathcal{C}_{rx,min}$, and
- the SINR coverage constraint is fulfilled: $\mathcal{C}_\gamma(\alpha, e) \geq \mathcal{C}_{\gamma,min}$, and
- the supremum load constraint is fulfilled: $\eta_i(\alpha, e) \leq \eta_{sup}$, $\forall i \in \mathcal{B}$, and
- the infimum load constraint is fulfilled: $\eta_i(\alpha, e) \geq \eta_{inf}$, $\forall i \in \mathcal{B}$ with the optimization variables
- BS physical parameters, summarized as e, and
- the degree of load balancing parameter $\alpha$.

The inventive algorithm is based on the knowledge of the spatial traffic demand $\sigma(u)$ and of the received power $p_i(u,e_i)$ for every $u \in \mathcal{L}$, corresponding to base station $i \in \mathcal{B}$ and to the set of physical parameters e. Quantities regarding constraints, i.e., $\mathcal{C}_{rx,min}$, $\mathcal{C}_{\gamma,min}$, $\eta_{inf}$, $\eta_{sup}$ are given as input variables, as well as the parameters a, b, $\alpha$, and M, where the latter denotes an abort criterion. Initial load balancing and physical parameters are given by e and $\alpha$, respectively.

For every optimization step, the cell shapes, i.e., partition of the served area $\mathcal{L}$, and cell loads $\eta_i(\alpha, e)$ are calculated subject to the cell definition $\mathcal{L}_i(\alpha, e)$.

Figure 2:
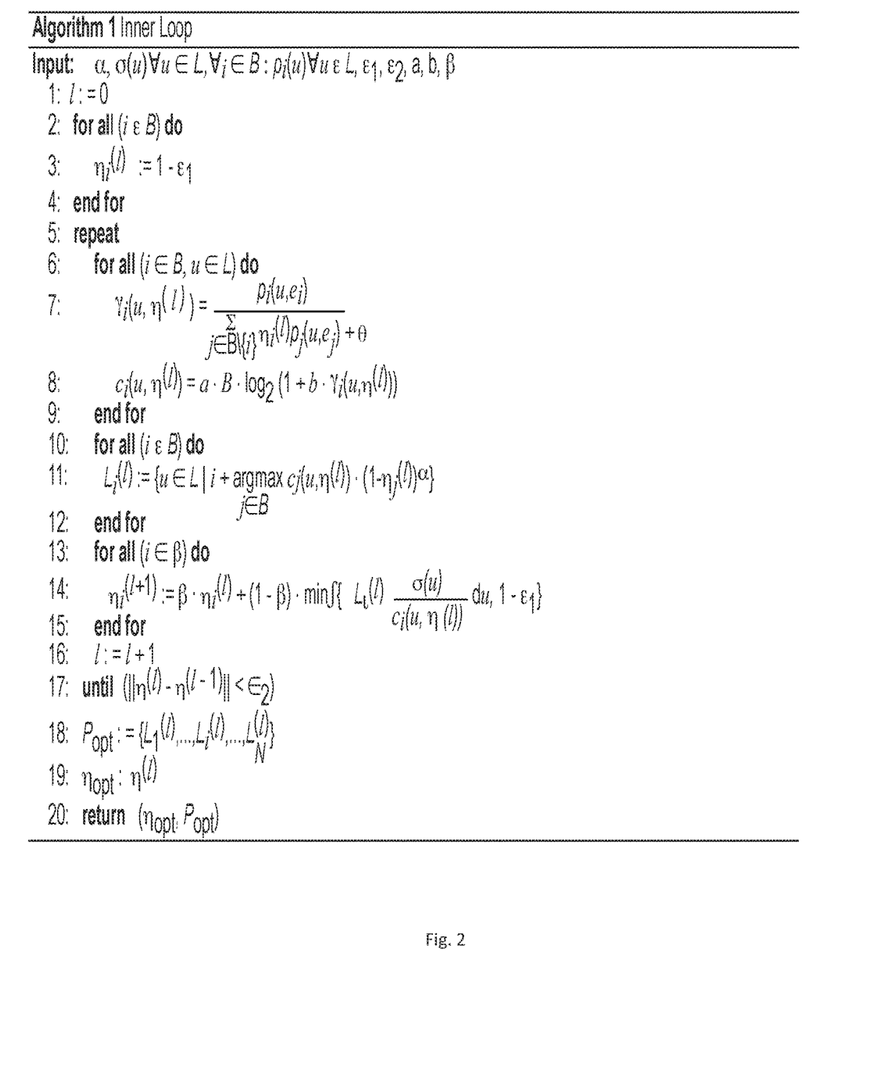
FIG. 2 shows an algorithm for a partitioning strategy referred to as inner loop.

Since the cell partition is a function of the cell load-dependent achievable rate $c_i$, the bound of integration also depends on the cell load vector $\eta$. The fixed point iteration employed for the partitioning strategy, which solves this system of equations, is calculated as shown in FIG. 2.

Begin Inner Loop

For the given values of $\alpha$ and e, the fixed point algorithm described in H. Kim et al., "Distributed $\alpha$-Optimal User Association and Cell Load Balancing in Wireless Networks", IEEE/ACM Transactions on Networking 20:1, pp. 177-190 (2012) is used to calculate the cell loads $\eta_i$ and the corresponding partition $\mathcal{P}_{opt}$.

First, the cell load values of all base stations are set to $\eta_i := 1 - \in_1$, where $\in_1$ is an arbitrarily small positive constant. After this initialization step, three calculation steps are performed in each iteration l of a certain number of iterations, which is determined by when the fixed point is reached:

(1) For every point $u \in \mathcal{L}$ and with respect to every base station $i \in \mathcal{B}$, the rate $c_i(u,e,\eta^{(l)})$ is calculated with the aid of the (a, b)-parameterized Shannon formula, where the mean interference power is considered, i.e., $\eta_j^{(l)} \cdot p_j(u, e_j)$ including the updated load vector $\eta_j^{(l)}$. (line 7 and 8)

(2) For every base station $i \in \mathcal{B}$, the cell areas $\mathcal{L}_i^{(l)}$ are calculated with the aid of the user association rule with the load balancing parameter $\alpha$ as input. (line 11)

(3) For every base station $i \in \mathcal{B}$, the load $\eta_i^{(l+1)}$ used in the next iteration is recalculated according to an exponential averaging with a forgetting factor $\beta$ with the aid of the load formula $$\eta_i = \int_{\mathcal{L}_i^{(l)}} \frac{\sigma(u)}{c_i(u, e, \eta^{(l)})} du,$$

which considers the updated cell areas $\mathcal{L}_i^{(l)}$ and rates $c_i(u,e,\eta^{(l)})$. (line 14)

The set of cell areas $\mathcal{L}_i^{(l)}$ are returned as the optimal partition $\mathcal{P}_{opt}$, if the fixed point is reached after the l-th iteration. The fixed point is reached, if the load vector $\eta^{(l)}$ shows only small differences compared to the vector $\eta^{(l-1)}$ calculated in the previous iteration, which is indicated by the inequality $\|\eta^{(l)} - \eta^{(l-1)}\| < \in_2$, where $\in_2$ is an arbitrarily small positive constant.

The algorithm is used differently from how it is used in H. Kim et al., "Distributed $\alpha$-Optimal User Association and Cell Load Balancing in Wireless Networks", IEEE/ACM Transactions on Networking 20:1, pp. 177-190 (2012) as follows:

1. In the present invention, the BS do not measure their loads, rather, the load is calculated according to the spatial load distribution resp. traffic distribution. The knowledge of the traffic distribution and the received powers gives the benefit of calculating/predicting cell loads prior to a potential BS shut-down, shut-on, or putting to energy saving state. Practically, $p_i(u)$ could be reported by UEs (or even measured by BSs, if the channel is reciprocal), $\sigma(u)$ could, e.g., be obtained by geolocation techniques and traffic statistics.

2. In the present invention, the achievable rates $c_i(u,e,\eta^{(l)})$ are updated according to the corresponding load vector $\eta^{(l)}$ in every iteration (line 7). Here, k denotes the iteration index. In contrast, the algorithm described in H. Kim et al., "Distributed α-Optimal User Association and Cell Load Balancing in Wireless Networks", IEEE/ACM Transactions on Networking 20:1, pp. 177-190 (2012) uses the same fixed achievable rate in every iteration.

End Inner Loop

Then, using the above described algorithm as an inner loop, an optimal set of physical base station parameters is searched for in an outer loop while checking the constraints.

Begin Outer Loop

Figure 3:
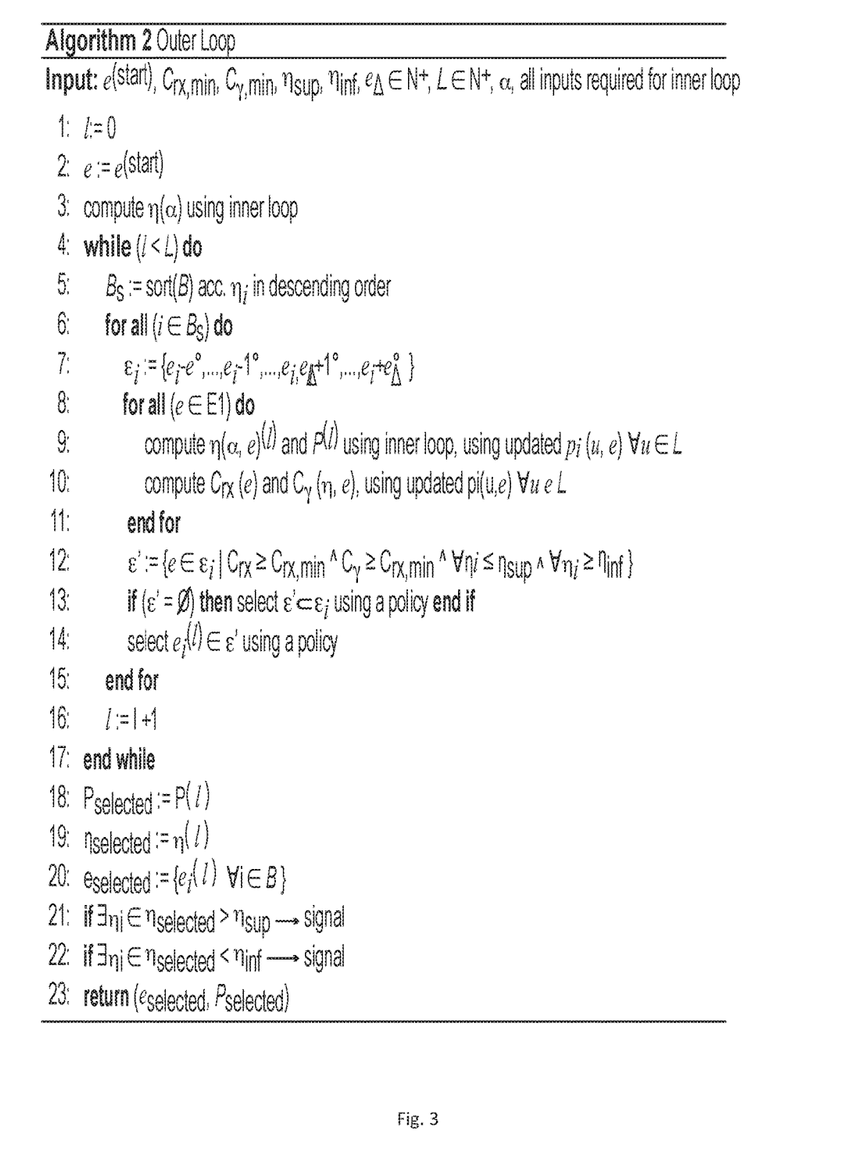
FIG. 3 shows an algorithm for an iterative direct search referred to as outer loop.

This algorithm does a direct search for a physical parameter vector e. All base stations are visited L times in the order of descending loads $\eta_i$. For every visit and for different values of the physical parameters $e_i$ of the currently visited base station i, the partition $\mathcal{P}$, the load vector $\eta$, the SINR coverage $\mathcal{C}_\gamma(e,\alpha)$ are computed using the "inner loop" as well as the RSRP coverage $\mathcal{C}_{rx}(e)$.

The physical parameters (or a subset thereof) $e_i$ are chosen from a set $\varepsilon_i = \{e_i - e_\Delta^\circ, \ldots, e_i + e_\Delta^\circ\}$ according to some policies as follows:

1. If all constraints can be met, then select a subset of $\varepsilon_i$ which contains all possible physical parameter values for this base station that fulfill all constraints.
2. If not all constrains can be met, then use a different (possibly operator-dependent) policy to find an accepted subset of $\varepsilon_i$. Policies could include:
   a. Do not check all constraints
   b. Consider different priorities among the constraints,
3. In case $\varepsilon_i$ contains more than one set of possible physical parameters, then choose one according to some (possibly operator-dependent) policy, which could include:
   a. The one which has the highest value for the coverage criterion
   b. The one which has the highest value for the SINR criterion
   c. The one which has the lowest value for the cell load or the sum of all cell loads.

An algorithm for the outer loop, hence, the iterative direct search for an optimal set of physical base station parameters is shown in FIG. 3.

A person skilled in the art will appreciate that there are other useful policies that can be found easily, see Embodiment 3 for a different example. The algorithm performance can be adjusted by changing the number of iterations L.

End Outer Loop

Both functions (inner and outer loop), can be implemented in different ways to, e. g.,
  include the constraints as penalty terms in the objective function,
  consider different physical parameter sub-sets e,
  consider additional parameters for the optimization method,
  achieve constraints prior to optimizing the objective,
  leave e and α constant (Embodiment One),
  leave α constant (Embodiment Two),
  leave e constant (Embodiment Three),
  optimize over both, e and α (Embodiment Four),
  apply different search algorithms to obtain an appropriate vector e (Embodiments Two and Four), or
  apply other policies to obtain an appropriate load balancing vector α.

The output of the inventive algorithm is a tuple (e, $\mathcal{P}_{opt}$), a vector e of BS physical parameters of length N and the optimal partition $\mathcal{P}_{opt} := \{\mathcal{L}_1, \ldots, \mathcal{L}_N\}$ of the served cell areas.

In case no partition $\mathcal{P} := \{\mathcal{L}_1, \ldots, \mathcal{L}_N\}$ which fulfills all constraints while optimizing over the degree of freedoms can be found, then a signal is to be given out stating which constraint cannot be fulfilled as follows:
  In case the supremum load constraint cannot be fulfilled:
    $\eta_i(e,\alpha) \leq \eta_{sup}, \forall i \in \mathcal{B}$.
  In case the infimum load constraint cannot be fulfilled:
    $\eta_i(e,\alpha) \geq \eta_{inf}, \forall i \in \mathcal{B}$.

The BS physical parameters included in e can directly be applied to the cellular networks configuration management system.

To apply the optimal partition $\mathcal{P}_{opt}$ to a real network, however, an accurate transformation is required in all variants of the inventive method, of the base station's serving area $\mathcal{L}_i$ in the optimized partition $\mathcal{P}_{opt} := \{\mathcal{L}_1, \ldots, \mathcal{L}_N\}$ into a 3GPP-compatible power offset to the received power of a base station's pilot or reference signal to be used to increase the base stations serving area for the purpose of user association in admission control (for cell selection), for cell re-selection (silent mode cell changes), and for handover (active mode cell change).

If in a certain 3GPP compatible implementation this power offset of a base station BS i is specific to the neighboring base station BS j, then this power offset shall be denoted by $CIO_{i,j}$, which is a cell individual offset (CIO) for the pair (i,j) of cells. The inventive method minimizes the sum overlap area between the cell borders (see FIG. 2) by adjusting a matrix of CIOs $C := (CIO_{i,j})^{N \times N}$. For the individual CIOs values between $-CIO_{max}$ and $CIO_{max}$ in steps of $CIO_\Delta$ are possible. Typical values can be 3 dB for $CIO_{max}$ and 0.5 dB for $CIO_\Delta$.

This power offset changes the receive power of the pilot or reference signal of BS i over the receive power of the pilot or reference signal of BS j in a linear scale as follows:

$$p_i(u,e_i) \cdot CIO_{i,j} \leftrightarrow p_j(u,e_j)$$

This power offset has the following effect: If $$p_i(u,e_i) \cdot CIO_{i,j} > p_j(u,e_j)$$

then a user will send a (connection) setup request to BS i instead of BS j even if
  $p_i(u,e_i) < p_j(u,e_j)$ (user association rule).

The transformation is done using: Let $$v^*(u) = \underset{i \in \mathcal{B}}{\arg\max}\, c_i(u, e, \eta) \cdot (1 - \eta_i)^\alpha \text{ and}$$

$$v(u, C) = \underset{i,j \in \mathcal{B}}{\arg\max}\, CIO_{i,j} \cdot \frac{P_{rx,i}(u, e_i)}{P_{rx,j}(u, e_j)}$$

be the functions that map the locations u to a BS according to the cell partitioning rule and the user association rule, respectively.

With $$1_i(x) := \begin{cases} 1 & \text{if } x = 1 \\ 0 & \text{else} \end{cases}$$

the matrix $C_{opt} = (CIO_{i,j})^{N \times N}$ is calculated as:

$$C_{opt} = \min_C \sum_{i \in \mathcal{B}} \int_{u \in \mathcal{L}} |1_i(\vartheta^*(u)) - 1_i(\vartheta(u, C))| du$$

FIG. 2 depicts the cell borders for three neighboring base stations i, j, k, for (1) if a user at location u associates with BS i, when its receive power $p_i$ is maximized (without CIOs, dashed line),
(2) if a user at location u associates with BS i according to the optimal partition $\mathcal{P}_{opt}$ (solid line).

The transformation of the optimal partition $\mathcal{P}_{opt}$ to the matrix $C_{opt}$ of CIO values is described as follows:

$\vartheta^*(u)$ denotes the index of the base station, which serves location u according to the partition $\mathcal{P}_{opt}$, $\vartheta(u,C)$ denotes the index of the base station, which serves location u, if the CIO matrix $C=(CIO_{i,j})^{N \times N}$ is applied, utilizing $$1_i(x) := \begin{cases} 1 & \text{if } x = 1 \\ 0 & \text{else} \end{cases}, \int_{u \in \mathcal{L}} |1_i(\vartheta^*(u)) - 1_i(\vartheta(u, C))| du$$

is the mismatch area regarding cell i, when both variants (CIO-based partition and optimal partition $\mathcal{P}_{opt}$) are compared (shaded areas), the transformation is done via minimizing the sum of mismatch areas considering all relevant cells, that is, calculating $C_{opt}$ according to $$C_{opt} = \min_C \sum_{i \in \mathcal{B}} \int_{u \in \mathcal{L}} |1_i(\vartheta^*(u)) - 1_i(\vartheta(u, C))| du, .$$

to obtain $C_{opt}$, an exhaustive search can be implemented.

If in another implementation the power offset of BS i is not specific to the neighboring base station j, then this power offset shall be denoted by $CIO_i$, which is a cell individual offset (CIO) for BS i. It is calculated as the arithmetic average in linear scale of the $CIO_{i,j}$ for all neighboring BSs m=1, . . . , M, of BS is i:

$$CIO_i = \frac{\sum_{1}^{M} CIO_{i,m}}{M}$$

DETAILED DESCRIPTIONS OF EXEMPLARY EMBODIMENTS

Embodiment One

This embodiment describes a variant of the inventive method which calculates the optimal partition of the served area for fixed physical base station parameters e and fixed load balancing parameter α.

The optimal partition $\mathcal{P}_{opt}$ is calculated using the "inner loop" algorithm and directly transformed to CIO values afterwards as described above. Then the CIO values are applied to the cellular network configuration management.

Embodiment Two

This embodiment describes a variant of the inventive method which calculates the optimal partition of the served area for a fixed load balancing parameter α while optimizing using direct search over the antenna tilts $e \in \{0, \ldots, 15\}^N$ as subset of the physical parameters of the base stations. This embodiment shows different examples of the policies needed in the outer loop. The algorithm is shown in FIG. 4.

The tilt $e_i$ is chosen from the set $\varepsilon_i = \{e_i - e_\Delta^\circ, \ldots, e_i + e_\Delta^\circ\}$ according to the rule as follows:
(1) If none of the elements in $\varepsilon_i$ fulfills the RSRP coverage constraint, the element is chosen that maximizes the RSRP coverage $\mathcal{C}_{rx}$. Otherwise, go to (2).
(2) If none of the elements in $\varepsilon_i$ fulfills the RSRP and SINR coverage constraints, the element is chosen that fulfills the RSRP coverage constraint and maximizes SINR coverage $\mathcal{C}_\gamma$. Otherwise, go to (3).
(3) If none of the elements in $\varepsilon_i$ fulfills the RSRP and SINR coverage and supremum load constrains, the element is chosen that fulfills the RSRP coverage and SINR coverage constraints and minimizes the sum area $\sum_{\eta_i > \eta_{sup}} |\mathcal{L}_i|$ of overloaded cells. Otherwise, go to (4).
(4) Choose the element from $\varepsilon_i$ that fulfills the RSRP and SINR coverage and supremum load constraints and minimizes the sum of base station loads $\sum_{i \in \mathcal{B}} \eta_i$.

The optimal partition $\mathcal{P}_{opt}$ is transformed to CIO values afterwards (see inventive method). The CIO values and the base station antenna tilts e are applied to the cellular network configuration management.

Embodiment Three

This embodiment describes a variant of the inventive method which calculates the optimal partition of the served area for fixed physical base station parameters e while optimizing over the load balancing parameter α≥0.

Network statistics show a specific behavior as the load balancing parameter α varies. The following two are exploited:

1. For fixed e, the maximum cell load $$\max_i \{\eta_i(e, \alpha)\}$$

in the cluster to be optimized shows monotonically decreasing behavior as α increases. The minimum value for which the supremum load constraint is fulfilled, i. e., $\eta_i(e,\alpha) \leq \eta_{sup}$, $\forall i \in \mathcal{B}$, is denoted as $\alpha_{min}$.

2. For fixed e, the SINR coverage $\mathcal{C}_\gamma(e,\alpha)$ in the cluster to be optimized shows monotonically decreasing behavior as α increases. The maximum value for which the SINR coverage constraint is fulfilled, i. e., $\mathcal{C}_\gamma(e,\alpha) \geq \mathcal{C}_{\gamma,min}$, is denoted as $\alpha_{max}$.

Formally, the rule for selecting α is as follows:

$$\alpha = f_\alpha(\alpha_{max}, \alpha_{min}) := \begin{cases} 0 & \text{if } (\mathcal{C}_\gamma(\alpha_{min}) < \mathcal{C}_{\gamma,min} \text{ or } \mathcal{C}_\gamma(\alpha_{max}) < \mathcal{C}_{\gamma,min}) \\ \alpha_{max} & \text{if } \alpha_{min} > \alpha_{max}, \\ \alpha_{min} & \text{otherwise} \end{cases}.$$

With this rule the SINR constraint has a higher priority than the overload constraint. If there is no α, for which the minimum SINR coverage $\mathcal{C}_{\gamma,min}$ can be achieved, it is set to zero. If $\alpha_{min}$ exists but is larger than $\alpha_{max}$, i. e., both constraints can be fulfilled but not at the same time, α is set to $\alpha_{max}$. In all other cases, α is set to $\alpha_{min}$.

Figure 5:
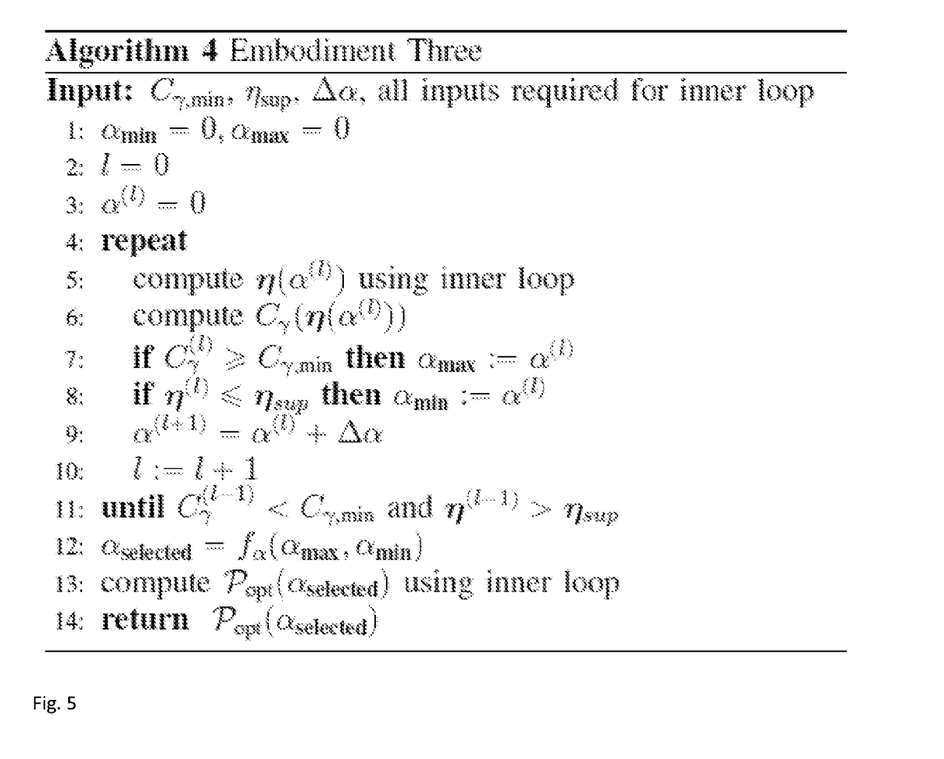
FIG. 5 shows an algorithm for an iterative direct search for fixed physical base station parameters while optimizing over a load balancing parameter.
Figure 7:
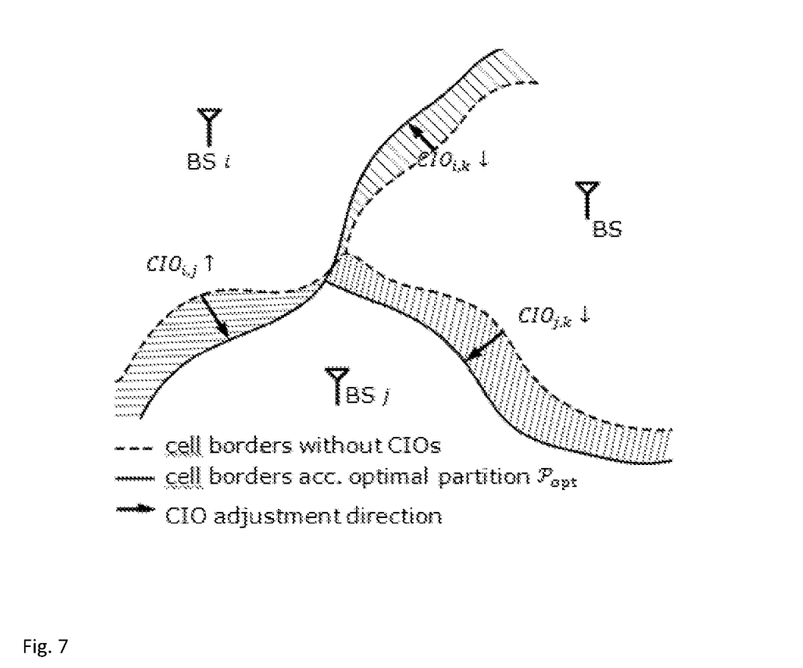
FIG. 7 shows cell borders for three neighboring base stations.

A possible step-wise procedure for finding $\alpha_{min}$ and $\alpha_{max}$ and selecting α is described by the algorithm as shown in FIG. 5:

The optimal partition $\mathcal{P}_{opt}$ is transformed to CIO values afterwards (see inventive method) and the CIO values are applied to the cellular network configuration management.

Embodiment Four

This embodiment describes a variant of the inventive method which calculates the optimal partition of the served area by optimizing over base station physical parameter sets and by optimizing over the load balancing parameter $\alpha \geq 0$. The algorithm is shown in FIG. 6.

In every step of the search procedure an appropriate load balancing parameter $\alpha$ is calculated in line 9 which is the only difference to the outer loop described in the section "Detailed Explanation of the Inventive Method".

The optimal partition $\mathcal{P}_{opt}$ is transformed to CIO values afterwards. The CIO values and the physical parameter base station e are applied to the cellular network configuration management.

Advantages

The method according to the present invention
combines mobility load balancing (MLB) with coverage and capacity optimization (CCO) in a joint and coordinated optimization, and which
explicitly considers the effect of the cell loads on the inter-cell interference, and which
provides a structured way of transforming the optimal cell partition to 3GPP standard compliant base station individual power offsets for the cell's reference- or pilot signal's received power used to increase the base stations serving area for the purpose of user association
in the sense that the optimized configuration fulfills certain constraints (i.e. assures a minimum pilot or reference signal received power coverage, a minimum SINR coverage, a maximum cell load for all cells, a minimum load for all cells) and taking the spatial distribution of the traffic demand (e.g., from measurements) explicitly into account.

The inventive method is able to predict an optimal network configuration for other traffic loads or sudden changes in the network configuration, e.g. a cell outage, so that is can also be used for the SON use case cell outage compensation (COC) or calculations of compensating network configuration changes in the sense of the energy saving management (ESM) 3GPP SON use case.

The invention claimed is:

1. A method for optimizing a real cellular, wireless communication network comprising a plurality of base stations and having a network configuration comprising a plurality of radio cells, the plurality of radio cells serving a served area; each of the plurality of radio cells covering a cell area which is further sub-divided into user locations, said network being defined by network parameters, the method comprising:
providing a model of said cellular, wireless communication network having an original model network configuration;
providing, for each of said user locations, a value of a received power of a pilot or reference signal and a traffic demand;
optimizing said model network configuration by performing an iterative direct search to determine an optimal set of physical base station parameters; wherein the iterative direct search comprises:
constraining the load of each of the plurality of base stations to a defined infimum such that the load is above the defined infimum; and
constraining the received power of the pilot or reference signal of each of the plurality of base stations such that the received power is above a defined threshold at least in a defined part of the serving area; and
constraining a signal-to-interference-and-noise ratio of the pilot or reference signal of each of the plurality of base stations such that the signal-to-interference-and noise ratio is above a defined threshold at least in a defined part of the serving area;
a partitioning strategy to jointly determine an optimal partition of the served area and an associated optimal load of each of the plurality of base stations for a current set of physical base station parameters for each direct search iteration;
said partitioning strategy using an updated value of the received power of the pilot or reference signal for each the plurality of user locations associated with the current set of physical base station parameters for each direct search iteration; and
using said optimized model network configuration to configure said real cellular, wireless communication network.

2. The method of claim 1, wherein the partitioning strategy comprises:
computing a signal-to-interference-and-noise ratio coverage using the optimal partition of the served area and associated optimal load for each of the plurality of base stations and the updated value of the received power of the pilot or reference signal for each of the plurality of user locations for each direct search iteration.

3. The method of claim 1, wherein the partitioning strategy comprises:
computing a reference signal received power coverage using the optimal partition of the served area and associated optimal load for each of the plurality of base stations and the updated value of the received power of the pilot or reference signal for each of the plurality of user locations for each direct search iteration.

4. The method of claim 1, wherein the partitioning strategy comprises:
minimizing a function of loads for each of the plurality of base stations.

5. The method of claim 4, wherein the partitioning strategy comprises:
explicitly considering an interdependency between an inter-base station interference and the load of a base station.

6. The method of claim 4, wherein the partitioning strategy comprises:
setting cell load values for each of the plurality of base stations to one minus an arbitrarily positive constant; and
iteratively searching for a fix point of the load of each of the plurality of base stations by
computing a data rate for each of the plurality of base stations by considering a mean interference power;
computing cell areas for each of the plurality of base stations using the given degree of load balancing; and
updating the load for each of the plurality of base stations by computing a ratio of a measured base station average resource utilization and the data rate for each of the plurality of base stations and applying an exponential averaging with a forgetting factor for each fix point iteration.

7. The method of claim 4, wherein the iterative direct search comprises:
constraining the load of each of the plurality of base stations to a defined supremum such that the load is below the defined supremum.

8. The method of claim 1, wherein using said optimized model network configuration to configure said real cellular, wireless communication network comprises:
transforming the optimal partition of the served area into a power offset for each of the plurality of base stations; and
adding the power offset to the transmit power of the pilot or reference signal of each of the plurality of base stations.

9. The method of claim 1, wherein the load of a base station is defined as the sum over all user locations in the base station's served area of the ratio of traffic demand and data rate per user location, wherein estimating the data rate per user location comprises considering a measured or estimated signal-to-interference and noise ratio at the user location.

10. The method of claim 1, wherein the iterative direct search comprises:
performing the partitioning strategy for each of the plurality of base stations in an order of descending loads.

11. The method of claim 7, the method comprising:
giving out a signal when no optimal partition fulfilling all imposed constraints could be found, said signal being indicative of a specific constraint that could not be fulfilled.

12. The method of claim 1, wherein optimizing said model network configuration comprises:
setting and maintaining a degree of load balancing and/or the set of physical base station parameters as constant.

13. The method of claim 1, the method comprising:
weighting, for each of said user locations, the traffic demand with a linear factor.

14. The method of claim 1, wherein providing, for each of said user locations, a traffic demand comprises:
obtaining said traffic demand by geolocation techniques and traffic statistics.

15. The method of claim 8, wherein transforming the optimal partition of the served area into a power offset for each of the plurality of base stations comprises:
determining a power offset for a base station that is specific to a neighboring base station by minimizing an integrated overlap area between cell borders.

16. The method of claim 1, wherein the iterative direct search comprises:
constraining the load of each of the plurality of base stations to the defined infimum such that the load is above the defined infimum.

17. The method of claim 1, wherein the iterative direct search comprises:
constraining the received power of the pilot or reference signal of each of the plurality of base stations such that the received power is above the defined threshold at least in a defined part of the serving area.

18. The method of claim 1, wherein the iterative direct search comprises:
constraining the signal-to-interference-and-noise ratio of the pilot or reference signal of each of the plurality of base stations such that the signal-to-interference- and noise ratio is above the defined threshold at least in a defined part of the serving area.

* * * * *